Sept. 9, 1958 O. L. WELKER 2,851,613
CONDITION RESPONSIVE CONTROL APPARATUS
Filed May 18, 1956
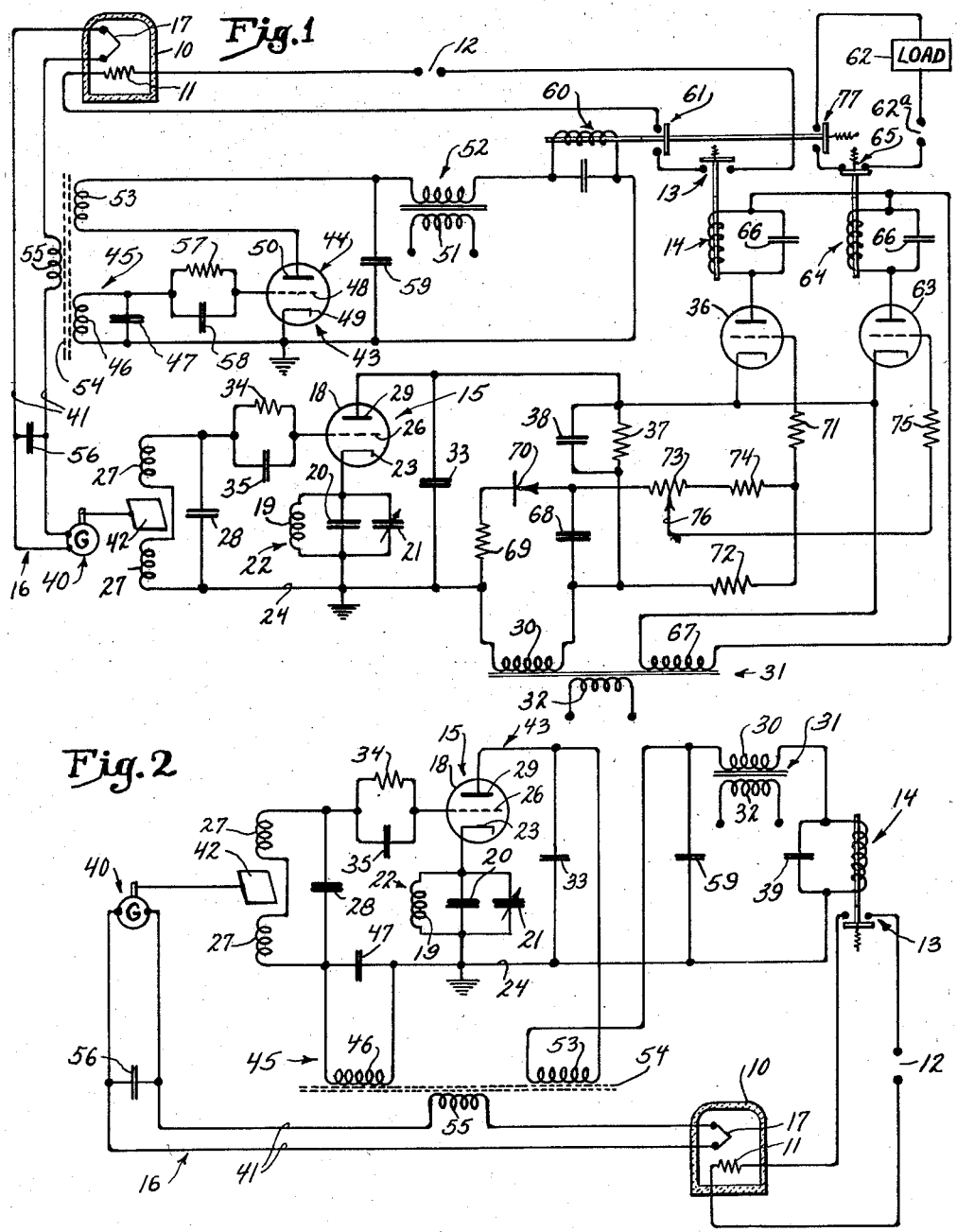
INVENTOR.
Oscar L. Welker
BY Carlson, Pitzner,
Hubbard & Wolfe
ATTORNEYS

United States Patent Office 2,851,613
Patented Sept. 9, 1958

2,851,613

CONDITION RESPONSIVE CONTROL APPARATUS

Oscar L. Welker, Rockford, Ill., assignor to Barber-Colman Company, Rockford, Ill., a corporation of Illinois Application May 18, 1956, Serial No. 585,650

5 Claims. (Cl. 307—31)

This invention relates generally to electrical control apparatus in which a signal derived from a measuring circuit and variable with changes of a condition being controlled is utilized to activate one or more devices for performing a control function such as correction of the condition when the same deviates from a desired value. More particularly, the invention relates to condition responsive apparatus of high sensitivity in which the control signal is of a unidirectional or low frequency character and which includes means for detecting an open circuit condition in the measuring circuit and for inactivating the control devices to prevent unsafe operation when such open circuit condition develops.

The primary object of the invention is to provide, in apparatus of the above character, novel open circuit detecting means which, as compared with such means in similar prior apparatus, introduces less error in the output signal of the measuring circuit when the latter is intact.

Another object is to provide novel detecting means which avoids introduction of error in the control signal by utilizing radio frequency currents to sense the condition of the measuring circuit.

A further object is to provide novel condition responsive apparatus in which a plurality of control devices are activated in response to deviations of the measured condition in opposite directions from one or more control values and all of the devices are rendered inactive in response to failure of the measuring circuit.

A more detailed object is to utilize the measuring circuit as the radio frequency load of an oscillator whose output current changes to vary the activation of a control device in response to an open circuit condition in the measuring circuit.

The invention also resides in the novel and simple arrangement of two oscillators one of which controls activation of a control device in response to variations in the output signal of the measuring circuit and the other of which overrides the controlling action of the first oscillator in response to the condition of the measuring circuit.

Other objects and advantages of the invention will become apparent from the following detailed description taken in connection with the accompanying drawings, in which:

Figure 1 is a schematic view and wiring diagram of control apparatus embodying the novel features of the present invention.

Fig. 2 is a similar view of a modified form of the invention.

While the invention is adaptable to different types of control apparatus responsive to various conditions such as temperature, pressure or speed, I have shown in the drawings and will describe in detail herein the preferred embodiment which is a system for regulating the temperature of the interior of an electric furnace 10 and maintaining the same at a desired value. It is to be understood, however, that I do not intend to limit the invention by such disclosure but aim to cover all modifications and alternative constructions falling within the spirit and scope of the invention as expressed in the appended claims.

In each of the control systems shown in the drawings, heat for the furnace 10 is derived from a resistance heater element 11 connected in series with a source 12 of alternating current and contacts 13 of a heat control relay 14 for completion of the heater circuit to raise the temperature of the furnace when the contacts are closed. Operation of the relay to activate and inactivate the load circuit through the heater is controlled by a radio frequency oscillator 15 in accordance with variations of an output signal of a measuring circuit 16 including a sensing element 17 for detecting changes in the furnace temperature.

The oscillator 15 in this instance comprises a vacuum tube triode 18 having an inductance coil 19 and parallel fixed and variable capacitors 20 and 21 forming a first resonant circuit 22 connected in series with the cathode 23 of the tube between the cathode and a grounded conductor 24. A second resonant circuit 25 connected between the grid 26 of the tube and the grounded conductor is formed by a pick-up coil 27 and a parallel capacitor 28. The output circuit of the oscillator extends from the cathode 23 to the plate 29 of the tube through the first resonant circuit 22, the grounded conductor 24, and a secondary winding 30 of a transformer 31 having its primary 32 connected to a suitable source of alternating current, a capacitor 33 connected between the plate and the grounded conductor providing a radio frequency by-pass around the secondary. To vary the unidirectional current flow in the output circuit with the strength of oscillations developed by the oscillator, a grid leak resistor 34 and a parallel capacitor 35 are connected in series with the grid 26 to utilize current from grid rectification to bias the grid negatively with respect to the cathode. Thus, the stronger are the oscillations, the higher will be the bias and the lower the output current flow.

Energization of the heat control relay 14 is varied with unidirectional current flow in the output circuit of the oscillator 15. In the control of Fig. 1, the relay is energized indirectly through the medium of a triode 36 whose conduction depends on the voltage across a resistor 37 and a parallel capacitor 38 in series with the transformer secondary 30 between the latter and the plate 29 of the oscillator tube 18. In the modified control of Fig. 2, however, the relay coil and a parallel filtering capacitor 39 are connected directly in the output circuit of the oscillator tube in series with the transformer secondary.

While the measuring circuit 16 may take various forms, in this instance it comprises the sensing element 17 in the form of a thermocouple connected in a closed series circuit with the coil of a D'Arsonval galvanometer 40 by conductors 41. The moving system of the galvanometer carries a flag or vane 42 of nonmagnetic conductive material such as aluminum which moves relative to spaced halves of the pick-up coil 27 of the second resonant circuit 25 of the oscillator 15 to vary the effective inductance of the coil and thereby the strength of oscillations developed by the oscillator in accordance with changes of the thermocouple voltage. With this arrangement, the position of the flag constitutes the measuring circuit output signal which varies with changes of the furnace temperature.

Depending on the values of the various elements 19, 20, 21, 27 and 28 of the two resonant circuits 22 and 25 and the ways in which the unidirectional output current of the oscillator 15 is utilized to control the relay 14 and in which the relay contacts 13 operate upon energization of the relay, activation and inactivation of the load circuit through the heater 11 may be effected at different positions of the flag 42 relative to the pick-up coil 27 corresponding to different furnace temperatures. In the present instance, the relay contacts are closed to activate the heater circuit when the furnace temperature and the corresponding thermocouple voltage are below selected control values and are open when the temperature and voltage rise above such values. Thus, when an open circuit develops in the measuring circuit 16 so that the voltage applied to the galvanometer 40 is zero, the galvanometer and the oscillator respond the same as for a low temperature and the heater circuit is closed thereby creating a hazardous condition.

In accordance with the present invention, novel means is provided for testing the condition of the measuring circuit 16 and disabling the control of the output signal of this circuit over the heater relay 14 so as to avoid the unsafe condition of energization of the heater when the measuring circuit is interrupted. To reduce error in the output signal of the measuring circuit when the latter is intact, this means acts independently of such signal and comprises a radio frequency detecting oscillator 43 having at least a portion of the measuring circuit as its radio frequency load. An output current of this oscillator varies with the amount of current drawn by such load and therefore with the condition of the measuring circuit and is utilized to inactivate the heater circuit upon interruption of the measuring circuit.

In the preferred control of Fig. 1 which is especially adapted for so-called two-point operation, the detecting oscillator 43 is separate from the condition responsive oscillator 15 and comprises a triode 44 having a resonant circuit 45 with an inductance coil 46 and a parallel capacitor 47 connected between the grid 48 and cathode 49 of the tube. The output circuit extending between the plate 50 and the cathode includes a secondary winding 51 of a plate supply transformer 52 whose primary winding is connected to a suitable source of alternating current. Regenerative feedback between the output circuit and the resonant circuit 45 is established by a tickler coil 53 connected in the output and inductively coupled to the tuning coil 46 of the resonant circuit. Such coupling is effected herein by winding the coils on a suitable core 54 of powdered ferrous material.

A portion of the measuring circuit 16 is utilized as the radio frequency load of the detecting oscillator 43 by connecting a third coil 55 in series with one of the thermocouple leads 41 and winding the coil on the core 54 for close inductive coupling to the tickler and tuning coils 53 and 46. In this instance, the latter are wound on opposite end portions of the core which is in the form of an elongated straight bar and the third coil is wound on the core between the tickler and tuning coils. To isolate the galvanometer 40 from the radio frequency currents, a by-pass capacitor 56 is connected between the conductors 41 on the galvanometer side of the third coil 55. The radio frequency load circuit for the oscillator then extends in series through this capacitor, the third coil, and the thermocouple 17. When this circuit is intact, it draws radio frequency current from the oscillator and the regenerative coupling between the tickler and tuning coils is reduced so that the oscillations are weak. When the circuit is interrupted, the regenerative coupling and therefore the strength of oscillations are increased. The unidirectional current in the output circuit through the transformer secondary 51 is varied in accordance with changes in the strength of oscillations by connecting a grid leak resistor 57 and a parallel capacitor 58 in series with the grid 48 the radio frequency currents being shunted around the secondatry winding through a by-pass capacitor 59.

To inactivate the control circuit through the heater 11 in the preferred control of Fig. 1 when the measuring circuit 16 is interrupted, the coil of a safety relay 60 having normally open contacts 61 in this circuit is connected in series with the transformer secondary 51 in the plate circuit of the detector oscillator 43. With this arrangement, the relay pulls in to condition the heater circuit for completion and interruption by the heat control relay 14 when the measuring circuit is intact so that the oscillations are weak. When the measuring circuit is interrupted for increase of the regenerative coupling and strong oscillations, the plate current is reduced and the disabling relay 60 drops out to interrupt the heater circuit.

The two-point operation of the preferred control of Fig. 1 is characterized by activation and inactivation of the circuit through the heater 11 when the temperature of the furnace 10 is respectively below and above a first value and activation and inactivation of a second circuit through an auxiliary load device 62 when the furnace temperature is respectively above and below a second value lower than the first. Such operation is obtained in this instance with an auxiliary load triode 63 whose plate current is utilized to energize a relay 64 having normally closed contacts 65 in series with the load device and a source 62$^a$ of voltage. As in the case of the heater triode 36, the plate current of the auxiliary triode varies with the voltage across the parallel load resistor 37 and capacitor 38 in the output circuit of the condition responsive oscillator 15. This voltage is applied between the cathodes and the grids of the two tubes in a direction to increase plate current and in opposition to negative bias voltages of different values. The output circuit of each tube extends from the plate thereof through the associated relay coil which is shunted by a filtering capacitor 66 and then to the cathode through a common secondary winding 67 of the transformer 31.

The negative bias voltages for the heater and auxiliary triodes 36 and 63 in this instance are derived from the voltage across a capacitor 68 connected in a shunt around the transformer secondary 30 of the condition responsive oscillator 15 and in series with a resistor 69 and a rectifier 70 polarized to build up a positive charge on the terminal of the capacitor connected to the load capacitor 38. The cathodes of the two tubes are connected to the plate or negative terminal of the load capacitor with the grid of the heater tube 36 connected through a current limiting resistor 71 to a junction of two bias paths. One of the latter extends to the positive terminals of the two capacitors through a fixed resistor 72 and the other path extends to the negative terminal of the bias capacitor 68 through a potentiometer resistor 73 and a series resistor 74. The grid of the auxiliary tube 63 is connected through a current limiting resistor 75 to the slider 76 of the potentiometer which is adjustable to vary the value of negative bias on this tube, such bias being greater than that applied to the grid of the heater tube. Herein, the values of the potentiometer resistor 73 and the resistor 74 in series therewith are 50,000 ohms and 1500 ohms respectively and the value of the resistor 72 in the other path is 33,000 ohms.

To decrease the current in the plate circuit of the condition responsive oscillator 15 and thereby the charge on the load capacitor 38 as the furnace temperature increases through the desired control values, the values of the reactance elements 19, 20, 21, 27 and 28 of the resonant circuits 22 and 25 are selected to block oscillations when the flag 42 is in a position corresponding to a low furnace temperature and to produce oscillations as the flag moves to positions corresponding to higher temperatures. In this instance, oscillations occur when the flag is within or closely adjacent the coils, the frequency of oscillation as determined by the values of the pick-up coil 27 and its parallel capacitor 28 then being such that the impedance of the cathode tuned circuit 22 is capacitive in character to cooperate with the capacitance between the grid 26 and the cathode 23 to form a voltage divider for establishing feedback in the oscillator.

As the flag 42 moves away from the pick-up coil 27, the inductance of the latter increases and corresponding decreases occur in the resonant frequency of the grid tuned circuit 25, in the effective capacitance of the cathode tuned circuit 22, and in the feedback ratio of the oscillator 15 so that the strength of oscillations also decreases. In one oscillator of this type having an alternating voltage source 30 of 260 volts at 60 cycles per second and a 12AU7 tube with the electrodes of its two triodes parallel to form, in effect, a single triode, the desired operation at an oscillation frequency of around 27 megacycles was obtained with the following values for the different resonant circuit elements: .5 of a microhenry for the coil 19, 22 micromicrofarads for fixed capacitor 20, and 8 to 50 micromicrofarads for the variable capacitor 21 in the cathode tuned circuit 22 and 10 micromicrofarads for the capacitor 28 and approximately 1 microhenry for the pick-up coil 27 in the grid resonant circuit 25.

In the operation of the two-point control of Fig. 1, let it be assumed that the measuring circuit 16 is intact and that the temperature of the furnace 10 is low with the flag 42 remote from the pick-up coil 27 so that no oscillations are generated in the condition responsive oscillator 15. Thus, insufficient bias is developed on the grid leak capacitor 35 for suppression of the plate current through the load resistor 37 paralleling the capacitor 38 and the latter is charged sufficiently to overcome the negative bias from the capacitor 68 and increase the plate current of the control tubes 36 and 63 for energization of the relays 14 and 64. The contacts 13 of the heater relay 14 then are closed in the energizing circuit of the heater 11 and the contacts 65 of the auxiliary relay 64 are open in the circuit of the load device 62.

The measuring circuit 16 being intact, the radio frequency load circuit of the detector oscillator 43 is completed through the thermocouple 17, the capacitor 56, and the coil 55 and draws radio frequency current with a correspondingly high output current through the safety relay 60. Stated another way, the regenerative coupling between the tuning and tickler coils 46 and 53 and the strength of oscillations in the detector oscillator are reduced with the measuring circuit intact. This results in less negative bias potential on the grid leak capacitor 58 and a large plate current to energize the safety relay and close the contacts 61 thereof in the heater circuit and contacts 77 in the auxiliary load circuit. The load circuits then are conditioned for completion and interruption by the control relays 14 and 64.

Assuming the measuring circuit 16 remains intact with the safety relay 60 energized and both control relays 14 and 64 energized, the energizing circuit for the heater 11 is completed at the contacts 13 for increasing the temperature of the furnace 10. The thermocouple voltage then increases and the flag 42 is shifted toward and between the halves of the pick-up coil 27 to increase the resonant frequency of the grid tuned circuit 25 for generation of oscillations in the condition responsive oscillator 15. This produces an increase in the negative bias on the grid leak capacitor 35 and corresponding reductions of the charge on the load capacitor 38 and the plate currents of the control tubes 36 and 63. At some value of furnace temperature predetermined by the selection of various circuit components including the bias resistors 72, 73 and 74, the plate current of the auxiliary tube 63 is reduced far enough for drop-out of the auxiliary relay 64 and closure of its contacts 65 to complete the energizing circuit for the load device 62. Since the negative bias on the grid of the heater tube 36 is less than that on the auxiliary tube, the plate current of the heater tube is high enough to maintain the heater relay 14 energized when the auxiliary relay drops out. However, as soon as the furnace temperature reaches a selected higher value, the heater relay also drops out to interrupt the heater circuit at the contacts 13.

After the heater relay 14 drops out the furnace 10 enters a cooling period and its temperature decreases with a corresponding shift of the flag 42 away from the pick-up coil 27 and a decrease of the plate current of the condition responsive oscillator 15. As the temperature decreases below the higher value but before it reaches a value low enough for pull-in of the auxiliary relay 64, the heater relay 14 pulls in for completion of the heater circuit at the contacts 13 and the start of another furnace heating period. Such cycling of the heater tube and relay continues so long as the measuring circuit is intact.

Should the measuring circuit 16 be interrupted between the thermocouple 17 and the by-pass capacitor 56, the thermocouple voltage as seen by the galvanometer 40 appears to be zero so that the flag 42 moves to a position corresponding to a low temperature below the range of drop-out values of the load relays 14 and 64 and both of the latter are energized with the contacts 13 closed in the heater circuit. At the same time, however, the radio frequency load circuit of the detector oscillator 43 is interrupted and the regenerative coupling between the tuning and tickler coils 46 and 53 is increased to produce stronger oscillations and suppress the plate current below the drop-out value of the safety relay 60. Both of the load circuits then are inactivated by opening of the safety relay contacts 61 and 77 and control over these circuits thereby is removed from the condition responsive parts including the galvanometer, the condition responsive oscillator 15, and the load relays. This condition of the load circuits prevails until the measuring circuit again is completed.

In the modified control of Fig. 2 in which current in the output circuit of the condition responsive oscillator 15 is sensed directly by the heater relay 14, the same triode 18, grid leak resistor 34 and capacitor 35 are utilized for both the condition responsive oscillator and the detector oscillator 43 thereby simplifying the apparatus while still providing the desired inactivation of the circuit through the heater 11 upon interruption of the measuring circuit 16. This is accomplished by connecting between the grid resonant circuit 25 of the condition responsive oscillator and the grounded conductor 24, the resonant circuit 45 of the detector oscillator, comprising the tuning coil 46 and the parallel capacitor 47 and, between the plate 29 of the tube and ground in the oscillator plate to cathode circuit, the tickler coil 53, the radio frequency detector oscillator current being shunted around the heater relay 14 and the transformer secondary 30 through the shunt capacitor 59. As in the preferred control of Fig. 1, the coil 55 in series with the thermocouple 17 is wound on the central portion of the core 54 between the tuning and tickler coils for reducing the regenerative coupling between the latter when the measuring circuit is intact.

To enable the condition responsive oscillator 15 to control the heater relay 14 in accordance with changes of the furnace temperature and the detector oscillator 43 to assume control of the relay upon interruption of the measuring circuit 16, the two oscillators oscillate at different frequencies and the values of reactance elements of each of two oscillators are selected to present low impedance to currents at the oscillation frequency of the other oscillator. Thus, the capacitors 20, 21 and 28 of the resonant circuits 22 and 25, while tuning the latter to the condition responsive frequency, in this instance around 27 megacycles per second, are of the proper value to present negligible impedance at the detector frequency, herein 100 kilocycles per second. The capacitor 47 in the detector resonant circuit 45 tunes the latter to the detector frequency of 100 kilocycles but also presents a low impedance to current at the higher frequency of 27 megacycles. With the heater relay 14 sensing current in the plate circuit of the triode 18 directly, the contacts 13 in the heater circuit are normally open for inactivation of the heater circuit by deenergization of the relay when the measuring circuit is interrupted and the strength of the detector oscillations increases.

In the operation of the modified control of Fig. 2, let it be assumed that the temperature of the furnace 10 is below the desired value and that the measuring circuit 16 is intact so that the oscillations of the detector oscillator 43 are weak. To energize the heater relay 14 and complete the circuit for supplying heat to the furnace, the position of the flag 42 at low furnace temperatures is remote from the pick-up coil 27 as in the preferred control of Fig. 1, the flag moving toward the coil when the furnace temperature and therefore the thermocouple voltage rise.

With the flag remote from the pick-up coil 27, substantially no oscillations are generated in the condition responsive oscillator 15 and, the detector oscillations being weak, the plate current of the triode 18 is large enough for pull-in of the heater relay 14 and closure of the heater circuit at the contacts 13. This produces a rise in the furnace temperature and a corresponding movement of the flag toward and between the halves of the pick-up coil 27. As the flag reaches a position within the coil corresponding to the desired control temperature value, the condition responsive oscillator 15 develops strong oscillations and a negative bias develops on the grid leak capacitor 35 for suppression of the plate current below the drop-out value of the relay and interruption of the heater circuit at the contacts 13. In the following cooling period, the flag moves away from the pick-up coil and the strength of the condition responsive oscillations decreases thereby reducing the negative bias of the grid leak capacitor with a corresponding rise of plate current and pull-in of the relay to complete the heater circuit.

Activation and inactivation of the circuit through the heater 11 under the control of the condition responsive oscillator 15 continues as long as the measuring circuit 16 remains intact due to reduction of the regenerative coupling between the tuning and tickler coils 46 and 53 and to the correspondingly weak oscillations of the detector oscillator 43. As soon as the measuring circuit is interrupted, however, the regenerative coupling between the tuning and tickler coils increases and strong oscillations develop at the detector frequency. A negative charge then builds up on the grid side of the grid leak capacitor 35 and the plate current is suppressed thereby to a value below the drop-out value of the relay 14. As a result, the latter is deenergized and its contacts 13 open to inactivate the heater circuit. The negative bias on the grid and suppression of the plate current remain regardless of the strength of oscillations at the condition responsive frequency. Thus, control of the heater circuit by the condition responsive oscillator 15 is disabled as long as the measuring circuit is interrupted.

In both of the controls described above, the use of radio frequency currents to detect a break in the measuring circuit 16 and inactivate the heater circuit in response thereto reduces the possibility of introducing error during normal operation of the measuring circuit. One reason for this is that the galvanometer 40 responds to direct current and therefore is not affected by voltages in the measuring circuit, particularly across the thermocouple 17, resulting from the high frequency currents. Also, the resistance of the detecting coil 55 is negligibly small as compared to that of the remainder of the measuring circuit so that the unidirectional voltage across this coil resulting from thermocouple current has little effect on the galvanometer. With the detector oscillator 43 separate from the condition responsive oscillator 15 as shown in Fig. 1, the safety relay operates independently of the galvanometer 40 and the output signal of the measuring circuit and therefore may be utilized to perform auxiliary control functions, for example, giving an alarm, in addition to inactivating the load circuits. In the control of Fig. 2 where the separate relay is not desired, parts of the condition responsive oscillator are utilized for the detector oscillator so as to simplify the control while still achieving inactivation of the heater circuit upon interruption of the measuring circuit.

I claim as my invention:

1. The combination of, a measuring circuit including a condition sensing element and providing a control signal variable with changes of a condition being measured, an electronic radio frequency oscillator adapted to oscillate at both a high frequency and a low frequency and having input and output circuits including first reactance elements for establishing oscillations at one of said frequencies and second reactance elements for establishing oscillations at the other frequency, said first elements having low impedance at said other frequency and said second elements having low impedance at said one frequency, means cooperating with said first elements and operable to vary the strength of oscillations at said one frequency in accordance with changes of said control signal, said second elements including a first coil connected in said input circuit and a second coil in said output circuit inductively coupled to the first coil for feedback of current at said other frequency, a third coil connected in said measuring circuit and inductively coupled to said first and second coils to increase the coupling between the latter and the strength of oscillations at said other frequency when an open circuit condition exists in said measuring circuit and to reduce such coupling and strength when the measuring circuit is intact, a load circuit, means controlling said load circuit in response to unidirectional current flow in said output circuit, and means operable to reduce said unidirectional output current in response to increases in the strength of oscillations at either of said frequencies.

2. The combination of, a measuring circuit providing an output signal variable with changes in a condition being measured, a load circuit, first control means for varying the condition of said load circuit in response to variations of said output signal when said measuring circuit is intact, and second control means operable to test the condition of said measuring circuit and to disable the control of said first means over the condition of said load circuit in response to detection of an open circuit condition in the measuring circuit, said second control means comprising a radio frequency oscillator having input and output circuits each including a coil inductively coupled to the coil of the other circuit to establish feedback between the circuits, a third coil conductively connected to said measuring circuit and inductively coupled to said oscillator coils to vary the coupling between the latter and the strength of oscillations in accordance with the condition of the measuring circuit, bias means for varying current flow in said output circuit, in accordance with the strength of said oscillations, and a device sensitive to changes in said output current and controlling said load circuit condition in response to such changes, said first control means comprising said output current sensitive device, reactance elements connected in said oscillator input and output circuits for establishing oscillations at a frequency different from that established through said oscillator coils, and means cooperating with said reactance elements to vary the strength of oscillations at said different frequency in accordance with changes of said output signal, said bias means varying said output current flow in accordance with the strength of oscillations at both said different frequency and said frequency established through said oscillator coils.

3. The combination of, an oscillator adapted to oscillate at each of two different first and second frequencies and having first elements of variable reactance for changing the strength of oscillations at said first frequency and second elements of variable reactance for changing the strength of oscillations at said second frequency, said oscillator including an output circuit having current flow therein variable with changes in the strength of oscillations at each of said frequencies, means responsive to a first condition and cooperating with said first reactance elements to vary the strength of oscillations at said first frequency in accordance with changes of the condition, means responsive to a second condition and cooperating with said second reactance elements to vary the strength of oscillations at said second frequency in accordance with changes of the second condition, and a current sensing device responsive to changes in said current in said output circuit.

4. The combination of, an electronic oscillator adapted to oscillate at each of two different first and second frequencies and including first elements variable in reactance to change the strength of oscillations at the first frequency and second elements variable in reactance to change the strength of oscillations at the second frequency, first condition responsive means cooperating with said first elements to vary the strength of oscillations at said first frequency in accordance with changes in a first condition, second condition responsive means cooperating with said second elements to vary the strength of oscillations at said second frequency in accordance with changes of a second condition, said first elements having low impedance at said second frequency so as to avoid interference with the control of the strength of oscillations at the second frequency by said second elements and the second elements having low impedance at said first frequency to avoid interference with the control of the strength of oscillations at the first frequency by the first elements, and control means responsive to variation in the strength of the oscillations at each of said frequencies.

5. The combination of, an oscillator adapted to oscillate at two different frequencies, first reactance elements associated with said oscillator and operable to vary the strength of oscillations at a first one of said frequencies in accordance with changes in a first condition being measured, second reactance elements associated with said oscillator and operable to vary the strength of oscillations at the second one of said frequencies in accordance with changes in a second condition being measured, and control means responsive to variation in the strength of the oscillations at each of said frequencies.

References Cited in the file of this patent

UNITED STATES PATENTS

| | | |
|---|---|---|
| 2,576,892 | Stanton | Nov. 27, 1951 |
| 2,653,279 | Ehret | Sept. 22, 1953 |